US008810838B2

(12) United States Patent
Miyata et al.

(10) Patent No.: US 8,810,838 B2
(45) Date of Patent: Aug. 19, 2014

(54) NONTRANSITORY STORAGE MEDIUM STORING INFORMATION PROCESSING PROGRAM, INFORMATION PROCESSING DEVICE, AND INFORMATION PROCESSING METHOD

(75) Inventors: Yuji Miyata, Kitanagoya (JP); Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 147 days.

(21) Appl. No.: 13/358,444

(22) Filed: Jan. 25, 2012

(65) Prior Publication Data

US 2012/0243039 A1  Sep. 27, 2012

(30) Foreign Application Priority Data

Mar. 25, 2011  (JP) .................. 2011-068996

(51) Int. Cl.
*G06F 3/12* (2006.01)
*H04N 1/00* (2006.01)

(52) U.S. Cl.
CPC .... *H04N 1/00244* (2013.01); *H04N 2201/0055* (2013.01); *H04N 2201/0089* (2013.01); *H04N 2201/0065* (2013.01); *H04N 1/00307* (2013.01); *H04N 2201/0082* (2013.01); *H04N 2201/001* (2013.01); *H04N 1/00458* (2013.01)
USPC .......................................... 358/1.15; 358/1.1

(58) Field of Classification Search
USPC .................................. 358/1.15, 1.1
See application file for complete search history.

(56) References Cited

U.S. PATENT DOCUMENTS

| 2003/0093490 | A1 | 5/2003 | Yamamoto et al. |
| 2005/0219640 | A1* | 10/2005 | Kasatani ................ 358/402 |
| 2007/0192491 | A1 | 8/2007 | Saigo et al. |

FOREIGN PATENT DOCUMENTS

| JP | H09-190330 A | 7/1997 |
| JP | 2000-090282 A | 3/2000 |
| JP | 2003-015832 A | 1/2003 |
| JP | 2003-141020 A | 5/2003 |
| JP | 2006-236285 A | 9/2006 |
| JP | 2006-339835 A | 12/2006 |
| JP | 2007-188238 A | 7/2007 |
| JP | 2007-219790 A | 8/2007 |

OTHER PUBLICATIONS

Ikeno H, Device, System and Method for Processing Data and Storage Medium, Mar. 31, 2000, JP 2000090282 A.*
Horiuchi, Kenichi, Communication System and Mobile Terminal, Dec. 14, 2006, JP 2006339835 A.*
Suzuki et al., System, Method for Printing, Device, Program for Processing Information and Recording Medium, Jan. 17, 2003, JP 2003015832 A.*
Japan Patent Office, Notification of Reasons for Refusal for Japanese Patent Application No. 2011-068996 (counterpart to above-captioned patent application), mailed Apr. 9, 2013.

* cited by examiner

*Primary Examiner* — Benny Q Tieu
*Assistant Examiner* — Martin Mushambo
(74) *Attorney, Agent, or Firm* — Baker Botts L.L.P.

(57) ABSTRACT

A nontransitory storage medium storing an information processing program to be executed by an information processing device, the program being designed to have the device function as: a display controlling section for controlling a display portion to display icon images; a transmission controlling section for controlling a transmitting portion to transmit user-selected targeted data among data corresponding to the icon images; an obtainment controlling section for controlling an obtaining portion to obtain converted data created by an external device based on the targeted data; and a storage controlling section for storing reduced-size image data created using the targeted data, into a storage portion such that the reduced-size image data is associated with the targeted data. For each data with which the reduced-size image data is associated, the display portion displays a reduced-size image corresponding to the reduced-size image data as an icon image.

14 Claims, 5 Drawing Sheets

NONTRANSITORY STORAGE MEDIUM STORING INFORMATION PROCESSING PROGRAM, INFORMATION PROCESSING DEVICE, AND INFORMATION PROCESSING METHOD

CROSS REFERENCE TO RELATED APPLICATION

The present application claims priority from Japanese Patent Application No. 2011-068996, which was filed on Mar. 25, 2011, the disclosure of which is herein incorporated by reference in its entirety.

BACKGROUND OF THE INVENTION

1. Field of the Invention

The present invention relates to a nontransitory storage medium storing an information processing program, an information processing device, and an information processing method.

2. Description of the Related Art

An information processing device such as a personal computer is configured to display icon images corresponding to various data such as files, on a display portion in list form for selection of the data by the user. In this operation, a reduced-size image called "thumbnail" may be displayed as the icon image in order to improve recognition of the data.

Meanwhile, there has been known a technique in which data having a format that is hard to process in a terminal device is uploaded from the terminal device to a server or a cloud, then the data is converted in the server or the cloud to data having a format usable in the terminal device, and then the converted data is transmitted to the terminal device such that the terminal device can use the converted data.

SUMMARY OF THE INVENTION

Thus, even in the data having the format that is hard to process in the terminal device, a thumbnail based on such data can be relatively easily displayed on the mobile terminal if the format of the data is uploaded and converted using the server or the cloud. However, if all data corresponding to icon images to be displayed are uploaded each time when the icon images are displayed in list form, a relatively long time is required for processing the data, which makes it impossible to speedily display the icon images. Further, in this case, data unexpected by a user are uploaded without limitation, which causes problems in terms of a privacy and a security.

This invention has been developed in view of the above-described situations to provide a nontransitory storage medium storing an information processing program, an information processing device, and an information processing method which can speedily display icon images and prevent data unexpected by a user from being transmitted to an outside.

The present invention provides a nontransitory storage medium storing an information processing program to be executed by a computer of an information processing device, the information processing program being designed to have the computer function as: a display controlling section configured to control a display portion of the information processing device to display thereon a plurality of icon images; a transmission controlling section configured to control a transmitting portion of the information processing device to transmit targeted data selected by a user among a plurality of data respectively corresponding to the plurality of icon images; an obtainment controlling section configured to control an obtaining portion of the information processing device to obtain converted data created by an external device that is different from the information processing device and that is configured to create the converted data by converting the targeted data transmitted from the transmitting portion; and a storage controlling section configured to store reduced-size image data created using the targeted data, into a storage portion of the information processing device such that the reduced-size image data is associated with the targeted data, wherein, for each of at least one data which is stored in the storage portion and with which the reduced-size image data is associated, among the plurality of data, the display controlling section controls the display portion to display a reduced-size image corresponding to the reduced-size image data as an icon image.

The present invention also provides an information processing device comprising: a display portion configured to display thereon a plurality of icon images; a transmitting portion configured to transmit targeted data selected by a user among a plurality of data respectively corresponding to the plurality of icon images; an obtaining portion configured to obtain converted data created by an external device that is different from the information processing device and that is configured to create the converted data by converting the targeted data transmitted from the transmitting portion; and a storage portion configured to store therein reduced-size image data created using the targeted data, such that the reduced-size image data is associated with the targeted data, wherein, for each of at least one data which is stored in the storage portion and with which the reduced-size image data is associated, among the plurality of data, the display portion displays a reduced-size image corresponding to the reduced-size image data as an icon image.

The present invention also provides an information processing method performed by an information processing device, the information processing method comprising: a display controlling step of controlling a display portion of the information processing device to display thereon a plurality of icon images; a transmission controlling step of controlling a transmitting portion of the information processing device to transmit targeted data selected by a user among a plurality of data respectively corresponding to the plurality of icon images; an obtainment controlling step of controlling an obtaining portion of the information processing device to obtain converted data created by an external device that is different from the information processing device and that is configured to create the converted data by converting the targeted data transmitted from the transmitting portion; and a storage controlling step of storing reduced-size image data created using the targeted data, into a storage portion of the information processing device such that the reduced-size image data is associated with the targeted data, wherein the display controlling step is a step of, for each of at least one data which is stored in the storage portion and with which the reduced-size image data is associated among the plurality of data, controlling the display portion to display a reduced-size image corresponding to the reduced-size image data as an icon image.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Figure 1:
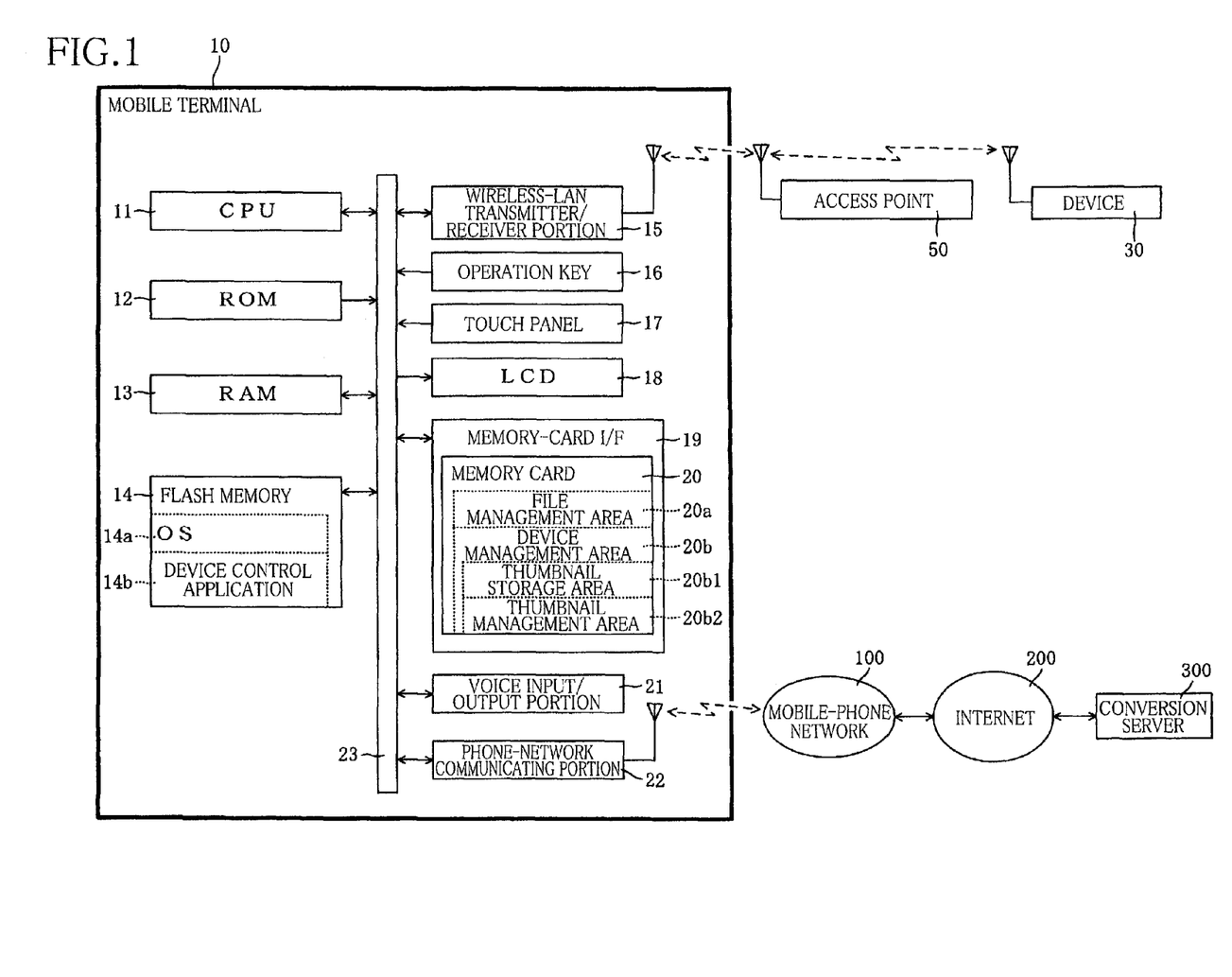
FIG. 1 is a block diagram showing an electric configuration of a mobile terminal having a device control application as one embodiment of the present invention.

Hereinafter, there will be described an embodiment of the present invention by reference to the drawings. As shown in FIG. 1, a mobile terminal 10 has a device control application 14b as one embodiment of the present invention. The device control application 14b in the mobile terminal 10 is an application for using a printing function and a scanning function of a device 30 directly from the mobile terminal 10 not via a personal computer or other devices. In particular, the device control application 14b as the present embodiment can speedily display icon images and prevent data unexpected by a user from being transmitted to an outside, giving the user a feeling of carefree in terms of a privacy and a security.

The mobile terminal 10 is a mobile phone device capable of performing voice conversation with another device or capable of using an interne 200 via a mobile-phone network 100. The mobile terminal 10 performs wireless communication with the device 30 in an infrastructure mode via an access point 50. The mobile terminal 10 includes a CPU 11, a ROM 12, a RAM 13, a flash memory 14, a wireless-LAN transmitter/receiver portion 15, operation keys 16, a touch panel 17, a liquid crystal display (LCD) 18, a memory-card interface (memory-card I/F) 19, a voice input/output portion 21, and a phone-network communicating portion 22. These components are connected to one another via a bus line 23.

The CPU 11 controls the components connected to the bus line 23 according to fixed value and programs stored in the ROM 12, for example. The ROM 12 is an unrewritable nonvolatile (nontransitory) memory, and the RAM 13 is a rewritable volatile memory.

The flash memory 14 is a rewritable nonvolatile memory that stores an operating system (OS) 14a and the device control application 14b. The OS 14a is basic software for performing standard functions of the mobile terminal 10. The OS 14a is Android™ in the present embodiment. The device control application 14b is an application provided by a vendor of the device 30 and installed on the mobile terminal 10 by the user, enabling the user to use the device 30 from the mobile terminal 10.

Hereinafter, the CPU 11 that executes programs such as applications and the OS 14a may be simply referred to as a name of the program. For example, words "the application" may mean "the CPU 11 that executes the application".

Each of the applications (including the device control application 14b) installed in the mobile terminal 10 calls an API of the OS 14a to send the OS 14a data to be passed to the components of the mobile terminal 10 such as the wireless-LAN transmitter/receiver portion 15, the operation keys 16, the touch panel 17, the LCD 18, the memory-card I/F 19, the voice input/output portion 21, and the phone-network communicating portion 22. That is, each application calls the API of the OS 14a to control the component(s) of the mobile terminal 10. Further, each application calls the API of the OS 14a to obtain, from the OS 14a, data such as (i) data outputted from the component(s) of the mobile terminal 10 and (ii) data indicating a state of each component. That is, each application calls the API of the OS 14a to obtain, from the OS 14a, data indicating the state of each component of the mobile terminal 10 (including a state of a user's input or operation for the mobile terminal 10). Further, the OS 14a notifies each application of the data such as (i) the data outputted from the component(s) of the mobile terminal 10 and (ii) the data indicating the state of each component, at regular intervals or each time when the state has been changed. That is, each application receives the notification from the OS 14a, thereby obtaining the data indicating the state of each component of the mobile terminal 10 (including the state of the user's input or operation for the mobile terminal 10).

The wireless-LAN transmitter/receiver portion 15 is a circuit for connecting the mobile terminal 10 to another device via Wi-Fi™ by using wireless LAN according to IEEE802.11b/g standards. This wireless-LAN transmitter/receiver portion 15 enables wireless communication between the mobile terminal 10 and the access point 50.

The operation keys 16 are hard keys provided on a casing of the mobile terminal 10 and used for inputting setting information and commands into the mobile terminal 10. The touch panel 17 is superposed on the LCD 18 and used for inputting the setting information and the commands into the mobile terminal 10. The LCD 18 displays thereon a file-list screen (which will be explained with reference to FIG. 3) and a preview screen (which will be explained with reference to FIG. 4). The memory-card I/F 19 is an interface on which a nonvolatile memory card 20 is to be mounted and that controls writing and reading-out of data on and from the memory card 20.

One example of the memory card 20 is an SD Card™. In the present embodiment, the memory card 20 includes a file management area 20a and a device management area 20b. The file management area 20a is an area for storing therein files downloaded from the internet 200, received files attached to e-mail, and files created on the basis of scan data obtained from the device 30, for example. It is noted that, in the present embodiment, the file management area 20a stores files in PDF format (hereinafter called "PDF files") and files in JPEG format (hereinafter called "JPEG files").

The device management area 20b is an area corresponding to folders, not shown, created by the device control application 14b when the device control application 14b is installed into the mobile terminal 10. As an area allocated to the device control application 14b, only the device control application 14b is allowed to rewrite data stored in the device management area 20b. The device management area 20b includes a thumbnail storage area 20b1 and a thumbnail management area 20b2. The thumbnail storage area 20b1 is an area for storing therein JPEG thumbnail data created on the basis of the PDF file(s) stored in the file management area 20a. The thumbnail management area 20b2 is an area for storing therein associated information in which a data name of the thumbnail data stored in the thumbnail storage area 20b1 and a file name of the PDF file based on which the thumbnail data has been created are associated with each other.

The voice input/output portion 21 is a voice input/output device including a microphone and a speaker. The phone-network communicating portion 22 is a circuit for communication via the mobile-phone network 100. The mobile-phone network 100 is communication network using IMT-2000 (International Mobile Telecommunication-2000) and allows the mobile terminal 10 to use the internet 200 when the mobile-phone network 100 is connected to the internet 200 via a gateway, not shown. A conversion server 300 provides a service for converting a PDF file uploaded from the mobile terminal 10 to a JPEG file to transmit the JPEG file to the mobile terminal 10.

The device 30 is a multi-function peripheral having various functions such as the printing function, the scanning function, and a copying function. The device 30 includes a wireless-LAN transmitter/receiver portion, not shown, having the same construction as the wireless-LAN transmitter/receiver portion 15 of the mobile terminal 10 and is connected to the mobile terminal 10 by the wireless communication using Wi-Fi via the access point 50. Further, the device 30 is controlled by the device control application 14b of the mobile terminal 10 to record or print an image on the basis of the data transmitted from the mobile terminal 10.

Figure 2:
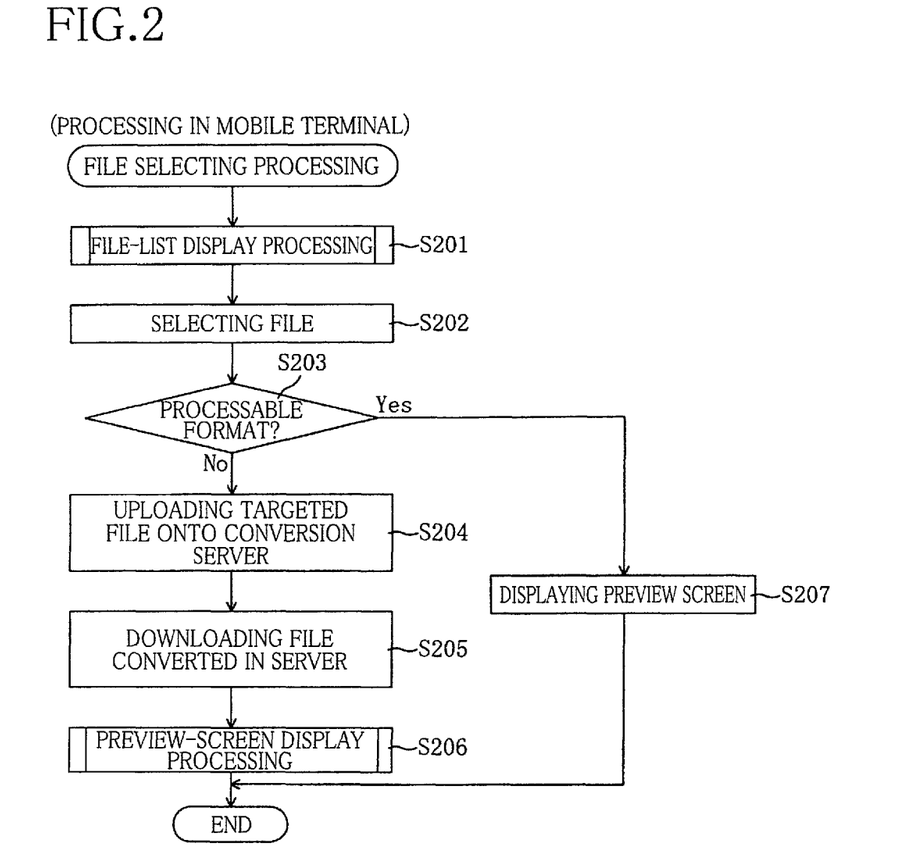
FIG. 2 is a flow-chart showing a file selecting processing executed by the mobile terminal.
Figure 5:
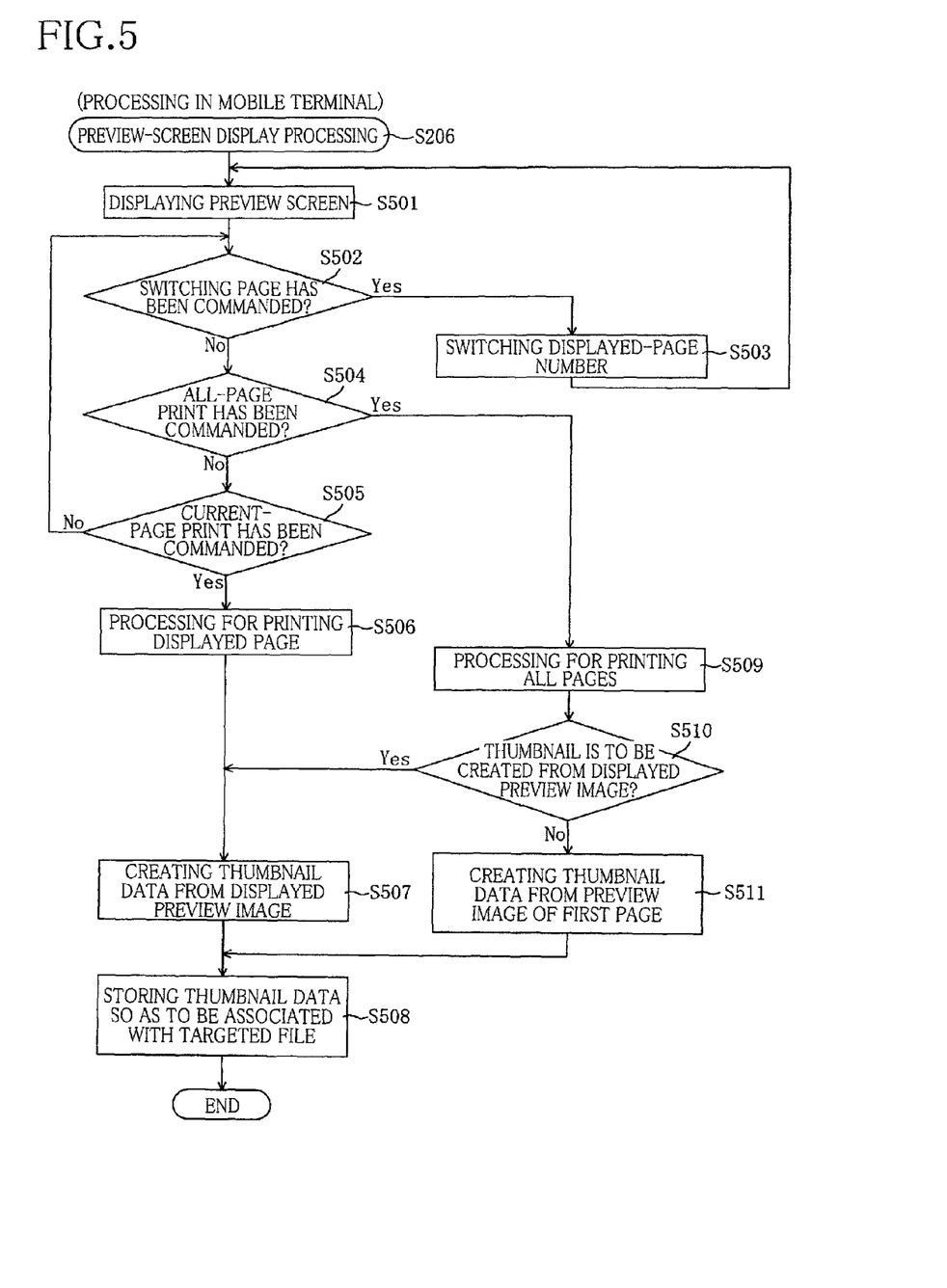
FIG. 5 is a flow-chart showing a preview-screen display processing executed by the mobile terminal.
Figure 6:
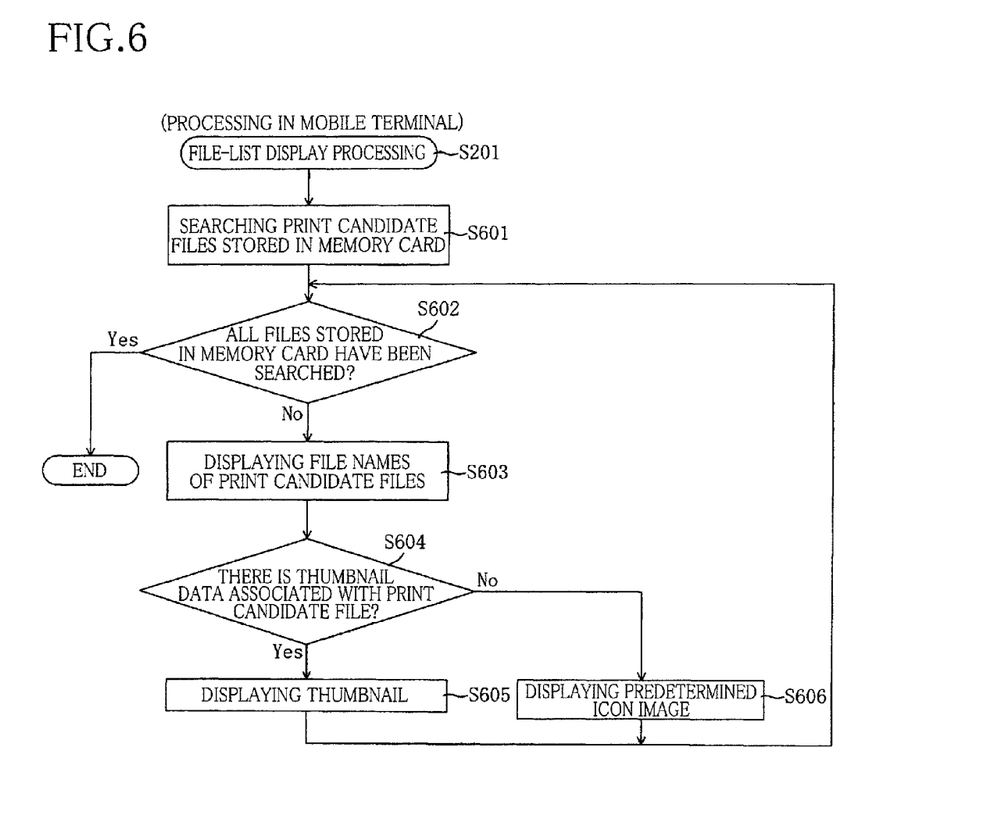
FIG. 6 is a flow-chart showing a file-list display processing executed by the mobile terminal.

FIG. 2 is a flow-chart showing a file selecting processing executed by the CPU 11 of the mobile terminal 10 according to the device control application 14b. This processing is a processing for making the user select a file or a page to be printed in the device 30, and this processing is executed when the user has started the device control application 14b in the mobile terminal 10. It is noted that steps (processings) in flow-charts which will be explained with reference to FIGS. 2, 5, and 6 are executed by the CPU 11 commanded by the device control application 14b or by the CPU 11 commanded by the device control application 14b using the OS 14a, for example. It is noted that each step may be replaced with a step executed by the CPU 11 commanded by the OS 14a or other applications. Further, each step may be replaced with a step executed not by the CPU 11 but by an operation of hardware provided on the mobile terminal 10.

Initially in S201, the CPU 11 executes a file-list display processing for displaying a plurality of icon images on the LCD 18.

Figure 3:
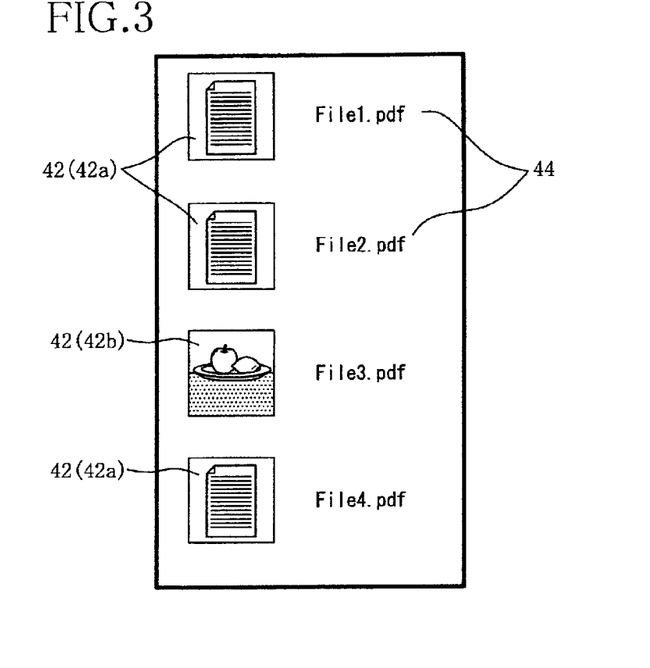
FIG. 3 is a view showing one example of a file-list screen displayed on the mobile terminal.

FIG. 3 is a view showing one example of the file-list screen displayed on the LCD 18 by the file-list display processing (S201). The file-list screen is a screen on which are displayed (i) icon images 42 respectively corresponding to the files stored in the memory card 20 and (ii) file names 44 such that the icon images 42 and the file names 44 are respectively associated with each other. Though specifically explained below with reference to FIG. 6, a predetermined icon image 42a is displayed for a file not storing thumbnail data among the files stored in the memory card 20 in the present embodiment. In this case, the user estimates a content of the file corresponding to the icon image 42 only by using the file name 44 as a lead.

For a file storing thumbnail data among the files stored in the memory card 20, a thumbnail 42b (as one example of a reduced-size image) corresponding to the thumbnail data is displayed as the icon image 42. Thus, the user can estimate the content of the file corresponding to the icon image 42 by using not only the file name 44 but also the thumbnail 42b as a lead.

Among a list of the icon images 42 displayed on the file-list screen, the user touches one of the icon images 42 which corresponds to a file the user wants to print, that is, the user selects a print targeted file as one example of print targeted data.

As shown in FIG. 2, the CPU 11 in S202 selects the file corresponding to the icon image 42 touched by the user. Hereinafter, the selected file may be referred to as "targeted file". Where a format of the targeted file is one of certain (predetermined) formats which can be processed by the mobile terminal 10 (S203: Yes), the CPU 11 goes to S207. On the other hand, where the format of the targeted file is not any of the certain formats (S203: No), the CPU 11 goes to S204. Here, each of the certain formats which can be processed by the mobile terminal 10 means a format that can be processed by the OS 14a or the hardware of the mobile terminal 10 and that enables an image and a thumbnail corresponding to data to be displayed without using applications installed by the user (other than preinstalled applications). In the present embodiment, where the format of the targeted file is the JPEG format, the CPU 11 judges that the format of the targeted file is one of the certain formats which can be processed by the mobile terminal 10, and where the format of the targeted file is the PDF format, the CPU 11 judges that the format of the targeted file is not any of the certain formats which can be processed by the mobile terminal 10. It is noted that each of the certain formats which can be processed by the mobile terminal 10 may mean a format that can be processed by the OS 14a or the hardware of the mobile terminal 10 (i.e., a format that enables the image and the thumbnail corresponding to the data to be displayed using the preinstalled applications and/or the applications installed by the user).

Where the targeted file is the JPEG format that is one of the certain formats which can be processed by the mobile terminal 10 (S203: Yes), the CPU 11 in S207 decompresses the JPEG-format file and displays the preview screen (see FIG. 4) on the LCD 18, and the CPU 11 finishes the processing.

On the other hand, where the targeted file is the PDF format that is not any of the certain formats which can be processed by the mobile terminal 10 (S203: No), the CPU 11 in S204 uploads (transmits) the targeted file to the conversion server 300 via the phone-network communicating portion 22. The conversion server 300 converts the targeted file uploaded by the mobile terminal 10 to create the JPEG file. Then in S205, the CPU 11 controls the phone-network communicating portion 22 to download (obtain) the JPEG file created in the conversion server 300 to store the JPEG file into the file management area 20a in the memory card 20. It is noted that, where the uploaded targeted file is a PDF file including data representative of a plurality of pages, the conversion server 300 converts the PDF file so as to create a plurality of JPEG files respectively corresponding to the pages of the PDF file and associates page numbers of the PDF file respectively to the JPEG files. The mobile terminal 10 downloads from the conversion server 300 the JPEG files respectively associated with the page numbers.

In S206, the CPU 11 executes a preview-screen display processing for displaying the preview screen by using the JPEG file(s) downloaded from the conversion server 300. It is noted that the preview-screen display processing (S206) will be explained in detail with reference to FIG. 5.

Figure 4:
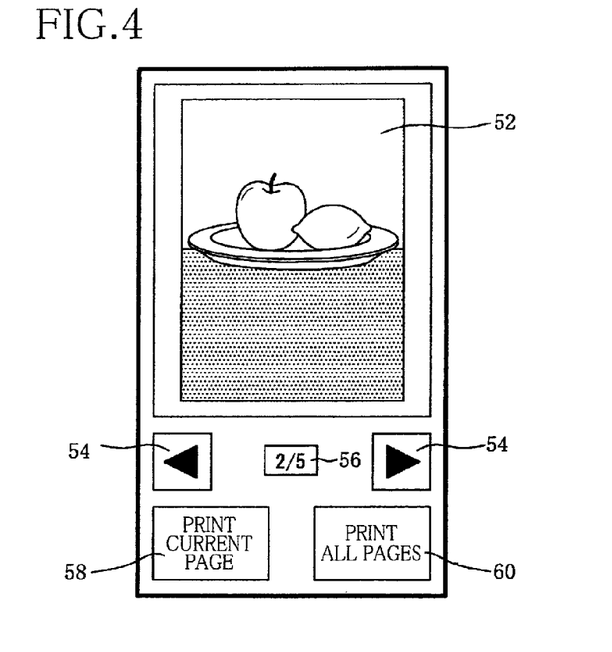
FIG. 4 is a view showing one example of a preview screen displayed on the mobile terminal.

As shown in FIG. 4, the preview screen includes a preview image 52, page switch buttons 54, page information 56, a current-page print button 58, and an all-page print button 60. The preview image 52 is displayed on the basis of decompressed data that is created by decompression of the JPEG file. The user views this preview image 52 to judge whether the user commands the printing or not. It is noted that, where the user has selected one of the JPEG files on the file-list screen (see FIG. 3), the device control application 14b displays the preview image 52 by using the selected JPEG file. On the other hand, where the user has selected one of the PDF files on the file-list screen, as explained with reference to FIG. 2, the device control application 14b updates the PDF file to the conversion server 300 to convert the PDF file to the JPEG file and then uses the JPEG file to display the preview image 52.

The page switch buttons 54 are buttons for switching the page to be displayed. The page information 56 is information representative of (i) the number of total pages contained in the file selected by the user and (ii) the page number of the preview image 52 being displayed. The page information 56 enables the user to recognize the page number of the preview image 52 being displayed, making it possible for the user to operate the page switch button(s) 54 to display the preview image 52 of a desired page on the LCD 18.

Where the user has touched the current-page print button 58, the device control application 14b controls the wireless-LAN transmitter/receiver portion 15 (see FIG. 1) to transmit, to the device 30, decompressed data created for displaying the preview image 52 being displayed, so that the device 30 records or prints a print targeted page that is a page the user wants to print. On the other hand, where the user has touched the all-page print button 60, the device control application 14b controls the wireless-LAN transmitter/receiver portion 15 to transmit, to the device 30, decompressed data of all pages including the data corresponding to the preview image 52 currently displayed on the LCD 18, so that the device 30 prints all the pages.

The mobile terminal 10 may have low processing capabilities when compared to normal personal computers. For example, the PDF file is hard to be processed by the standard functions of the mobile terminal 10. However, in the file selecting processing of the present embodiment, the targeted file having a format that is hard to process in the mobile terminal 10 is converted, by using the conversion server 300, to the file having the format capable of being processed by the mobile terminal 10, and then the preview image 52 is displayed and the printing command is outputted to the device 30 by using the converted file, making it possible to reduce a load on the processing of the mobile terminal 10.

There will be next explained the preview-screen display processing (S206) with reference to FIG. 5. The preview-screen display processing is a processing for displaying the preview screen (see FIG. 4) on the LCD 18 by using the JPEG file(s) downloaded from the conversion server 300 and for creating the thumbnail data to store the thumbnail data into the thumbnail storage area 20b1 of the memory card 20.

Initially in S501, the CPU 11 displays the preview screen (see FIG. 3) on the LCD 18. It is noted that, where the targeted file uploaded in S204 (see FIG. 2) contains the data representative of the plurality of pages, the plurality of JPEG files are downloaded from the conversion server 300, and thus the file management area 20a stores therein the plurality of the JPEG files based on the targeted file. In S501, the CPU 11 displays the preview image 52 by using a JPEG file created based on data representative of a first page.

Where the user has touched any of the page switch buttons 54 to switch the page (S502: Yes), the CPU 11 in S503 switches or changes the page number of the image to be displayed as the preview image 52. Specifically, the CPU 11 reads out, from the file management area 20a, the JPEG file with which has been associated the page selected by the user having operated the page switch button(s) 54. The CPU 11 then decompresses the JPEG file to create decompressed data, and displays on the LCD 18 the preview image 52 of the selected page on the basis of the decompressed data (S501). The CPU 11 then goes to S502 to select the page to be displayed on the basis of the operation of the user.

Where the user has not touched any of the page switch buttons 54 (S502: No), and where all-page print has not been commanded (S504: No), and where current-page print has not been commanded (S505: No), the CPU 11 returns to S502. Accordingly, the user can check the image of each page and search the print targeted page while switching or changing the page displayed on the preview image 52.

Where the user has found the print targeted page as a result of the above-mentioned processings and touched the current-page print button 58 to command the current-page print (S505: Yes), the CPU 11 in S506 selects as the print targeted page the page being displayed and commands the device 30 to print the page. Specifically, the decompressed data created from the JPEG file to display the preview image 52 is transmitted to the device 30 via the wireless-LAN transmitter/receiver portion 15. It is noted that, where the device 30 can process the JPEG file, the JPEG file corresponding to the print targeted page may be transmitted from the mobile terminal 10 to the device 30 to command the device 30 to print the page.

Then in S507, the CPU 11 creates the thumbnail data on the basis of the decompressed data used for the print command. Since the thumbnail data is created on the basis of the decompressed data used not only for displaying the preview image 52 but also for the print command, there is no need to decompress the JPEG file several times, resulting in an efficient processing.

Then in S508, the CPU 11 stores the created thumbnail data into the thumbnail storage area 20b1 of the memory card 20. Further, the CPU 11 stores, into the thumbnail management area 20b2 of the memory card 20, associated information in which a data name of the thumbnail data and a file name of the targeted file based on which the thumbnail data has been created are associated with each other. Here, where thumbnail data previously created based on the PDF file (the targeted file) selected in S202 has already been stored in the state in which the data name of the thumbnail data and the file name of the PDF file are associated with each other, and where the thumbnail data for the same PDF file has been newly created, the CPU 11 overwrites the currently-stored thumbnail data with the newly-created thumbnail data. This configuration makes it possible to prevent the thumbnail data from being uselessly accumulated in the memory card 20. Further, it is possible to store the thumbnail data based on the latest print targeted page selected by the user.

It is noted that, since the thumbnail data and the associated information are stored into the device management area 20b in the memory card 20 (i.e., the area assigned to the device control application 14b), the device control application 14b can determine the data name of the thumbnail data by its original rule, thereby avoiding a risk that the thumbnail data is deleted by other applications.

On the other hand, where the user has touched the all-page print button 60 to command the all-page print (S504: Yes), the CPU 11 in S509 commands the device 30 to print all the pages. Specifically, the CPU 11 decompresses all the JPEG files downloaded from the conversion server 300 and transmits the decompressed data to the device 30.

Then in S510, the CPU 11 asks the user whether to create thumbnail data or not based on the preview image 52 being displayed. Where the user has selected the creation of the thumbnail data based on the preview image 52 being displayed (S510: Yes), the CPU 11 goes to S507 in which the CPU 11 creates the thumbnail data for the page being displayed.

On the other hand, where the user has not selected the creation of the thumbnail data based on the preview image 52 being displayed (S510: No), the CPU 11 in S511 creates thumbnail data corresponding to a first page (i.e., a top page) of the targeted file by using the JPEG file. Then in S508, the CPU 11 stores the created thumbnail data such that the thumbnail data is associated with the targeted file based on which the thumbnail data has been created.

In this preview-screen display processing (S206), since the thumbnail data is created using the JPEG file obtained from the conversion server 300 in order to display the preview image 52, this processing is efficient when compared with a case where the JPEG file is obtained only for creating the thumbnail data.

Further, where the CPU 11 creates the thumbnail data representative of the page selected by the user as the print targeted page (S507), the CPU 11 can display, as the icon image 42, the thumbnail 42b of the page having a high possibility of being important for the user.

Further, where the CPU 11 creates the thumbnail data representative of the first page (S511), the CPU 11 can display, as the icon image 42, the thumbnail 42b of the first page having a high possibility of being useful for the user to recognize a content of the data.

Further, where the thumbnail data is created based on the preview image 52 being displayed (S507), the CPU 11 can display, as the icon image 42, the thumbnail 42b of the page whose content is grasped by the user because the user has viewed the page once.

It is noted that, in this preview-screen display processing (S206), the CPU 11 uses the JPEG file downloaded from the conversion server 300 to create the thumbnail data in the mobile terminal 10. Instead of this configuration, the preview-screen display processing (S206) may be designed such that the JPEG file and the thumbnail data are created in the conversion server 300, and the mobile terminal 10 downloads these JPEG file and thumbnail data. However, where the thumbnail data is created in the mobile terminal 10 without creating the thumbnail data in the conversion server 300 as in the present embodiment, it is possible to shorten a length of time required for (i) a standby time (or a waiting time) in which the CPU 11 waits for the return of the data from the conversion server 300 and (ii) the communication with the conversion server 300, making it possible for the user of the mobile terminal 10 to view the preview image 52 in a relatively short time. Further, the thumbnail data is created after the user has selected the print targeted page in the present embodiment, the CPU 11 can determine the page appropriate for the thumbnail 42b on the basis of the selection of the page by the user and create the thumbnail data representative of the page.

There will be next explained the file-list display processing (S201) with reference to FIG. 6. The file-list display processing (S201) is a processing for displaying the file-list screen (see FIG. 3) on the LCD 18. Initially in S601, the CPU 11 searches, among the files stored in the memory card 20, files (print candidate files) each having a format, based on which the device control application 14b can command the printing from the mobile terminal 10 to the device 30. In the present embodiment, the print candidate files include the PDF file and the JPEG file.

Where the CPU 11 has judged that the search for all the files stored in the memory card 20 has not been completed (S602: No), the CPU 11 in S603 displays, on the file-list screen, file names of the respective print candidate files extracted by the search.

Then in S604, the CPU 11 judges for each of the print candidate files whether there is thumbnail data associated with the print candidate file. Specifically, where the print candidate file is the PDF file, the CPU 11 judges whether the associated information including the file name is stored in the thumbnail management area 20b2 or not. On the other hand, where the print candidate file is the JPEG file, the CPU 11 judges whether the thumbnail data is contained or embedded in a header of the JPEG file or not. This is because the JPEG file contains the thumbnail data in its header in advance in almost all cases.

Where there is thumbnail data associated with the print candidate file (S604: Yes), the CPU 11 in S605 displays the thumbnail 42b as the icon image 42 on the file-list screen (see FIG. 3). Specifically, where the print candidate file is the PDF file, the CPU 11 obtains a data name of the thumbnail data which is associated with a file name of the print candidate file, on the basis of the associated information stored in the thumbnail management area 20b2 and then reads out the thumbnail data identified by the data name from the thumbnail storage area 20b1. The CPU 11 then displays the thumbnail 42b based on the thumbnail data on the file-list screen. On the other hand, where the print candidate file is the JPEG file, the CPU 11 displays the thumbnail 42b by using the thumbnail data contained in the header of the JPEG file.

On the other hand, where there is no thumbnail data associated with the print candidate file (S604: No), the CPU 11 in S606 displays the predetermined icon image 42a as the icon image 42 on the file-list screen and then returns to S602.

Where the CPU 11 has completed the search for all the files in the memory card 20 by repeating the above-described processings (S602: Yes), the CPU 11 finishes this file-list display processing.

In this file-list display processing (S201) shown in FIG. 6, the file-list screen explained with reference to FIG. 3 can be displayed on the LCD 18. As a result, for each of the files previously selected by the user, the thumbnail 42b corresponding to the thumbnail data associated with the file can be displayed as the icon image 42, making it possible for the user to easily identify the file.

Further, as described above, this device control application 14b is configured such that, in order to display the preview image 52 of each file having a format that is hard to process in the mobile terminal 10, the file selected by the user is temporarily uploaded to the conversion server 300. In this regard, since the file is selected by the user, the user may not have much resistance to the upload if the uploading operation is described and explained in advance in a specification, for example. However, if all the files are uploaded to display the file-list screen (FIG. 3), the user may have uncomfortable feelings from the viewpoint of the privacy and the security.

In order to solve such problems, this device control application 14b is configured such that the CPU 11 transmits only the targeted file selected by the user to the conversion server 300 and then creates the thumbnail data by using the converted file transmitted from the conversion server 300. Thus, it is possible to prevent the data unexpected by the user from being transmitted to the outside, thereby giving the user the feelings of carefree in terms of the privacy and the security.

Further, in the file-list display processing, the predetermined icon image 42a is displayed for each stored file with which the thumbnail data is not associated, making it possible for the user to recognize each file with which the thumbnail data is not associated.

In the above-described embodiment, the mobile terminal 10 is one example of an information processing device. The conversion server 300 is one example of an external device. The PDF file is one example of a targeted data (object data), and the JPEG file is one example of a converted data.

The CPU 11 is one example of a computer and a creating portion. The wireless-LAN transmitter/receiver portion 15 is one example of a transmitting and receiving portion. The LCD 18 is one example of a display portion. Each of the memory-card I/F 19 and the memory card 20 is one example of a storage portion. The phone-network communicating portion 22 is one example of a transmitting portion and an obtaining portion. It should be noted that each of the obtaining portion, the creating portion, the transmitting and receiving portion, the display portion, and the transmitting portion may be a unit of hardware or hardware operated by executing the program of the present invention or programs other than that of the present invention such as the operating system. Further, each of these portions may be hardware operated by combining processings of a plurality of programs with one another. Further, the storage portion may be a memory mounted in the mobile terminal 10 such as the flash memory 14.

In view of the above, the CPU 11 can be considered to include a display controlling section for executing the processing in S201, for example. Further, the CPU 11 can be considered to include a transmission controlling section for executing the processing in S204, for example. Further, the CPU 11 can be considered to include an obtainment controlling section for executing the processing in S205, for example. Further, the CPU 11 can be considered to include a storage controlling section for executing the processing in S508, for example. Further, the CPU 11 can be considered to include a creation controlling section for executing the processing in S507, S511, for example. Further, the CPU 11 can be considered to include a print commanding section for executing the processing in S506, S509, for example. Further, the CPU 11 can be considered to include a command receiving section for executing the processing in S510, for example. Further, the CPU 11 can be considered to include a selection display section for executing the processing in S501, for example. Further, the CPU 11 can be considered to include an associated-information storing section for executing the processing in S508, for example.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiment, the mobile terminal 10 having the phone-conversation function is one example of the information processing device, but various devices not having the phone-conversation function such as a personal computer and a digital camera may be used as the information processing device.

Further, in the above-described embodiment, where the device control application 14b has been started by the user in the mobile terminal 10, the CPU 11 executes the file selecting processing (see FIG. 2). However, in a case where the OS 14a is Android™ OS, where the device control application 14b has been selected as an object to which sharing data is to be outputted by a sharing function of the Android™ OS, the file selecting processing (see FIG. 2) may be executed.

Further, in the above-described embodiment, the JPEG format is one example of the format that can be processed by the standard functions of the mobile terminal 10. However, the format is not limited to the JPEG format. For example, various formats such as a PNG format, a GIF format, and a BMP format correspond to the format that can be processed by the mobile terminal 10.

Further, in the above-described embodiment, the PDF format is one example of the format that is hard to process in the mobile terminal 10. However, the format is not limited to the PDF format. For example, various format such as a DOC format and an XLS format correspond to the format that is hard to process in the mobile terminal 10. Further, even in a case of a file having a format capable of being processed by an application installed into the mobile terminal 10, some versions of the application may make it difficult to display the preview image 52. Thus, the above-described embodiment may be modified such that such a targeted file is processed in the same manner as that of the file having the format that is hard to process in the mobile terminal 10, regardless of the format of the target file.

Further, in the above-described embodiment, the predetermined icon image 42a is displayed for the file for which the thumbnail data is not stored. However, no icon image 42 may be displayed for the file for which the thumbnail data is not stored.

Further, in the above-described embodiment, where the thumbnail data is stored so as to be associated with the file, the thumbnail 42b corresponding to the thumbnail data is displayed as the icon image 42. In this case, identification information (such as "New" and "Update") indicating update of the file may be attached to the thumbnail 42b for the file updated after the creation of the thumbnail data.

Specifically, when the thumbnail data is created using the data downloaded from the conversion server 300 and stored into the memory card 20, a time stamp and/or a file size of the targeted data based on which the thumbnail data has been created is stored so as to be associated with the thumbnail data. When the icon image 42 of the targeted file is displayed in the next or subsequent time, the CPU compares a time stamp and/or a file size associated with the thumbnail data with the latest time stamp and/or file size of the targeted file to judge whether the targeted file has been updated or not after the creation of the thumbnail data. Where the CPU has judged that the targeted file has been updated, the thumbnail 42b is displayed with the identification information.

Further, in the above-described embodiment, the file name 44 is displayed with the icon image 42, but various information useful for estimating the content of the file such as a file size and a date and time of creation of the file may be displayed in addition to the icon image 42 and the file name 44.

Further, in the above-described embodiment, the mobile terminal 10 uploads the targeted file to the conversion server 300, and the conversion server 300 converts the targeted file. However, a server device for receiving the targeted data uploaded from the mobile terminal 10 may be physically different from a server device for converting the targeted data to transmit the converted data to the mobile terminal 10.

Further, in the above-described embodiment, the thumbnail data is created by the mobile terminal 10. Instead of this configuration, the device control application 14b may be configured to command the mobile terminal 10 to control the external device such as the conversion server 300 to create the thumbnail data. In this case, the mobile terminal 10 may obtain a plurality of thumbnail data respectively corresponding to a plurality of pages from the external device to display one or more of the plurality of thumbnail data as the icon image(s) 42. The device control application 14b may be configured such that the CPU 11 transmits the page number to the external device upon uploading the targeted data and obtains the thumbnail data created by the external device for the data corresponding to the page number.

Further, in the above-described embodiment, the thumbnail data is created for the file selected by the user as the print targeted file. However, the preview-screen display processing (see FIG. 5) may be modified such that, also for the file selected by the user to view the preview image, the CPU 11 displays the preview image by using the converted data obtained from the external server and creates the thumbnail data.

Further, in the above-described embodiment, the mobile terminal 10 is connected to the internet 200 via the mobile-phone network 100 by the phone-network communicating portion 22. However, the present invention is also applicable to a configuration in which the mobile terminal 10 is connected to the internet 200 via the access point 50 by the wireless-LAN transmitter/receiver portion 15 in order to save communication expenses.

It is noted that the present invention is applicable to the information processing device, a controller for controlling the information processing device, an information processing system, an information processing method, and a storage medium for storing an information processing program, for example.

What is claimed is:

1. A nontransitory storage medium storing an information processing program to be executed by a computer of an information processing device, the information processing program being designed to have the computer function as:
   a display controlling section configured to control a display portion of the information processing device to display thereon a plurality of icon images;
   a transmission controlling section configured to control a transmitting portion of the information processing device to transmit targeted data selected by a user among a plurality of data respectively corresponding to the plurality of icon images, the targeted data having a format in which a reduced-size image corresponding to the targeted data is not displayable on the basis of the targeted data;
   an obtainment controlling section configured to control an obtaining portion of the information processing device to obtain converted data created by an external device that is different from the information processing device and is converted from the targeted data transmitted from the transmitting portion, the converted data having a format in which the reduced-size image corresponding to the targeted data is displayable on the basis of the converted data, the reduced-size image being an image represented by reduced-size data created using the converted data; and
   a storage controlling section configured to store the reduced-size image data created using the converted data, into a storage portion of the information processing device such that the reduced-size image data is associated with the targeted data,
   wherein, for each of at least one data which is stored in the storage portion and with which the reduced-size image data is associated, among the plurality of data, the display controlling section controls the display portion to display the reduced-size image corresponding to the reduced-size image data as an icon image,
   wherein the storage controlling section is configured to store the reduced-size image data into a setting area of the storage portion which has been set by the information processing program,
   wherein the information processing program is designed to have the computer further function as an associated-information storing section configured to store, into the setting area of the storage portion, associated information indicating association between the targeted data and the reduced-size image data created using the targeted data, and
   wherein the display controlling section is configured to control the display portion to display the reduced-size image corresponding to the reduced-size image data as an icon image by using the reduced-size image data associated with the targeted data on the basis of the associated information stored in the storage portion.

2. The nontransitory storage medium according to claim 1, wherein the targeted data is a print targeted data selected by an operation of the user, the print targeted data being data based on which printing is performed.

3. The nontransitory storage medium according to claim 1, wherein the display controlling section is configured to control the display portion to display a predetermined icon image for each of at least one data which is stored in the storage portion and with which the reduced-size image data is not associated among the plurality of data.

4. The nontransitory storage medium according to claim 1, wherein, where the targeted data selected by the user has already been stored in the storage portion in a state in which the reduced-size image data is associated with the targeted data, and where reduced-size image data has been newly created on the basis of the targeted data, the storage controlling section is configured to control the storage portion to overwrite the reduced-size image data having already been stored, with the reduced-size image data newly created.

5. An information processing device comprising:
   a display portion configured to display thereon a plurality of icon images;
   a transmitting portion configured to transmit targeted data selected by a user among a plurality of data respectively corresponding to the plurality of icon images, the targeted data having a format in which a reduced-size image corresponding to the targeted data is not displayable on the basis of the targeted data;
   an obtaining portion configured to obtain converted data created by an external device that is different from the information processing device and is converted from the targeted data transmitted from the transmitting portion, the converted data having a format in which the reduced-size image corresponding to the targeted data is displayable on the basis of the converted data, the reduced-size image being an image represented by reduced-size data created using the converted data; and
   a storage portion configured to store therein the reduced-size image data created using the converted data, such that the reduced-size image data is associated with the targeted data,
   wherein, for each of at least one data which is stored in the storage portion and with which the reduced-size image data is associated, among the plurality of data, the display portion displays the reduced-size image corresponding to the reduced-size image data as an icon image,
   wherein the storage portion is configured to store the reduced-size image data into a setting area of the storage portion which has been set by the information processing device,
   an associated-information storing section configured to store, into the setting area of the storage portion, associated information indicating association between the targeted data and the reduced-size image data created using the targeted data, and
   wherein the display portion is configured to display the reduced-size image corresponding to the reduced-size image data as an icon image by using the reduced-size image data associated with the targeted data on the basis of the associated information stored in the storage portion.

6. An information processing method performed by an information processing device, the information processing method comprising:

a display controlling step of controlling a display portion of the information processing device to display thereon a plurality of icon images;

a transmission controlling step of controlling a transmitting portion of the information processing device to transmit targeted data selected by a user among a plurality of data respectively corresponding to the plurality of icon images, the targeted data having a format in which a reduced-size image corresponding to the targeted data is not displayable on the basis of the targeted data;

an obtainment controlling step of controlling an obtaining portion of the information processing device to obtain converted data created by an external device that is different from the information processing device and is converted from the targeted data transmitted from the transmitting portion, the converted data having a format in which the reduced-size image corresponding to the targeted data is displayable on the basis of the converted data, the reduced-size image being an image represented by reduced-size data created using the converted data; and a storage controlling step of storing the reduced-size image data created using the converted data, into a storage portion of the information processing device such that the reduced-size image data is associated with the targeted data, wherein the display controlling step is a step of, for each of at least one data which is stored in the storage portion and with which the reduced-size image data is associated among the plurality of data, controlling the display portion to display the reduced-size image corresponding to the reduced-size image data as an icon image, wherein the storage controlling step stores the reduced-size image data into a setting area of the storage portion which has been set by the information processing device, an associated-information storing step of storing, into the setting area of the storage portion, associated information indicating association between the targeted data and the reduced-size image data created using the targeted data, and wherein the display controlling step controls the display portion to display the reduced-size image corresponding to the reduced-size image data as an icon image by using the reduced-size image data associated with the targeted data on the basis of the associated information stored in the storage portion.

7. A nontransitory storage medium storing an information processing program to be executed by a computer of an information processing device, the information processing program being designed to have the computer function as:

a display controlling section configured to control a display portion of the information processing device to display thereon a plurality of icon images;

a transmission controlling section configured to control a transmitting portion of the information processing device to transmit targeted data selected by a user among a plurality of data respectively corresponding to the plurality of icon images, the targeted data having a format in which a reduced-size image corresponding to the targeted data is not displayable on the basis of the targeted data;

an obtainment controlling section configured to control an obtaining portion of the information processing device to obtain converted data created by an external device that is different from the information processing device and is converted from the targeted data transmitted from the transmitting portion, the converted data having a format in which the reduced-size image corresponding to the targeted data is displayable on the basis of the converted data, the reduced-size image being an image represented by reduced-size data created using the converted data; and a storage controlling section configured to store the reduced-size image data created using the converted data, into a storage portion of the information processing device such that the reduced-size image data is associated with the targeted data, wherein, for each of at least one data which is stored in the storage portion and with which the reduced-size image data is associated, among the plurality of data, the display controlling section controls the display portion to display the reduced-size image corresponding to the reduced-size image data as an icon image, wherein the information processing program is designed to have the computer further function as a creation controlling section configured to control a creating portion of the information processing device to create the reduced-size image data by using the converted data obtained by the obtaining portion, and wherein the storage controlling section is configured to store the reduced-size image data created by the creating portion into the storage portion.

8. The nontransitory storage medium according to claim 7, wherein the information processing program is designed to have the computer further function as:

a print commanding section configured, where the targeted data selected by the user contains data representative of a plurality of pages, to control a transmitting and receiving portion of the information processing device to command printing of converted data corresponding to a print targeted page selected by an operation of the user among the converted data obtained by the obtaining portion, and wherein the creation controlling section is configured to control the creating portion to create reduced-size image data corresponding to a reduced-size image of the print targeted page.

9. The nontransitory storage medium according to claim 8, wherein the print commanding section is configured to control the transmitting and receiving portion to command the printing of the converted data by controlling the transmitting and receiving portion to transmit decompressed data created by decompression of the converted data corresponding to the print targeted page, and wherein the creation controlling section is configured to control the creating portion to create the reduced-size image data on the basis of the decompressed data used for the print command.

10. The nontransitory storage medium according to claim 7, wherein the information processing program is designed to have the computer further function as a print commanding section configured, where the targeted data selected by the user contains data representative of a plurality of pages, to control a transmitting and receiving portion of the information processing device to command printing of converted data corresponding to a print targeted page selected by the operation of the user among the converted data obtained by the obtaining portion, and wherein, where at least two of the plurality of pages have been selected as the print targeted page, the creation controlling section is configured to control the creating portion to create a reduced-size image data corresponding to a reduced-size image of a first page of the at least two pages contained in the targeted data.

11. The nontransitory storage medium according to claim 7, wherein the creation controlling section is configured to control the creating portion to create the reduced-size image data by using one of the targeted data and the converted data obtained by the obtaining portion, wherein the display controlling section is configured to use the one of the targeted data and the converted data to control the display portion to display, as a display targeted page, an image of one page of at least one print targeted page corresponding to the print targeted data, and wherein the creation controlling section is configured to control the creating portion to create reduced-size image data corresponding to a reduced-size image of the display targeted page.

12. The nontransitory storage medium according to claim 11, wherein the information processing program is designed to have the computer further function as a command receiving section configured to receive from the user a command of whether or not the creating portion is to create reduced-size image data corresponding to a reduced-size image of a display targeted page being displayed on the display portion, and wherein, where the command receiving section has received the command for commanding the creating portion to create the reduced-size image data corresponding to the reduced-size image of the display targeted page being displayed, the creation controlling section controls the creating portion to create the reduced-size image data by using data representative of the display targeted page being displayed.

13. The nontransitory storage medium according to claim 12, wherein, where the targeted data selected by the user contains data representative of a plurality of pages and where the command receiving section has received the command for commanding the creating portion not to create the reduced-size image data corresponding to the reduced-size image of the display targeted page being displayed, the creation controlling section controls the creating portion to create a reduced-size image data corresponding to a reduced-size image of a first page of the plurality of pages.

14. The nontransitory storage medium according to claim 7, wherein the information processing program is designed to have the computer further function as a selection display section configured, where the targeted data selected by the user contains data representative of a plurality of pages, to control the display portion to display a display targeted page selected by an operation of the user, by using converted data corresponding to the display targeted page among the converted data obtained by the obtaining portion, and wherein the creation controlling section is configured to control the creating portion to create reduced-size image data corresponding to a reduced-size image of the display targeted page.

* * * * *